(12) United States Patent
McConnell

(10) Patent No.: US 9,447,836 B2
(45) Date of Patent: Sep. 20, 2016

(54) FRICTION DAMPENED MECHANICAL STRUT

(71) Applicant: Barnes Group Inc., Bristol, CT (US)

(72) Inventor: Phillip McConnell, Swanton, OH (US)

(73) Assignee: Barnes Group Inc., Bristol, CT (US)

(*) Notice: Subject to any disclaimer, the term of this patent is extended or adjusted under 35 U.S.C. 154(b) by 0 days.

(21) Appl. No.: 14/496,184

(22) Filed: Sep. 25, 2014

(65) Prior Publication Data

US 2015/0091227 A1   Apr. 2, 2015

Related U.S. Application Data

(60) Provisional application No. 61/883,245, filed on Sep. 27, 2013.

(51) Int. Cl.
| | |
|---|---|
| *F16F 5/00* | (2006.01) |
| *F16F 13/00* | (2006.01) |
| *F16F 7/09* | (2006.01) |
| *F16F 13/02* | (2006.01) |

(52) U.S. Cl.
CPC ............... *F16F 13/005* (2013.01); *F16F 7/09* (2013.01); *F16F 13/02* (2013.01)

(58) Field of Classification Search
CPC .... F16F 13/106; F16F 13/105; F16F 15/067; F16F 9/19; F16F 9/3242; F16F 1/125; F16F 2230/007; F16F 3/08
USPC .................................................... 267/140.13
See application file for complete search history.

(56) References Cited

U.S. PATENT DOCUMENTS

| | | | | |
|---|---|---|---|---|
| 1,445,615 | A | * | 2/1923 | Ferres ........................ F16F 9/49 188/269 |
| 2,588,682 | A | * | 3/1952 | Wyeth .................... B60G 13/04 267/134 |
| 2,705,634 | A | | 4/1955 | Sampson et al. |
| 2,732,767 | A | * | 1/1956 | Herlach .................... F16F 7/08 188/129 |
| 3,151,877 | A | * | 10/1964 | Bajer ....................... B60G 3/18 267/222 |
| 3,856,285 | A | | 12/1974 | Yamada |
| 4,973,077 | A | * | 11/1990 | Kuwayama ........ B60G 21/0553 188/318 |
| 7,641,208 | B1 | * | 1/2010 | Barron ............... B60G 21/0556 280/124.106 |
| 8,220,807 | B2 | * | 7/2012 | Lorenzon ............... B60G 11/52 188/372 |
| 2009/0279656 | A1 | * | 11/2009 | Defilippis ................. F16F 9/19 376/260 |
| 2012/0110914 | A1 | * | 5/2012 | Salice ....................... F16F 9/19 49/386 |

FOREIGN PATENT DOCUMENTS

| | | | | | |
|---|---|---|---|---|---|
| GB | 771392 | A | * | 4/1957 | ................ F16F 7/08 |
| GB | 772419 | A | * | 4/1957 | ................ F16F 1/08 |
| GB | 938530 | A | * | 10/1963 | ................ B60G 3/18 |
| WO | 9313333 | | | 7/1993 | |

OTHER PUBLICATIONS

European Patent Office, Extended European Search Report for corresponding application EP14003313.5 (Feb. 25, 2015).

* cited by examiner

*Primary Examiner* — Robert A Siconolfi
*Assistant Examiner* — Mahbubur Rashid
(74) *Attorney, Agent, or Firm* — Fay Sharpe LLP

(57) ABSTRACT

A spring system that includes a compressible material that is used to control the speed of the rod movement and/or the end travel cushioning.

25 Claims, 2 Drawing Sheets

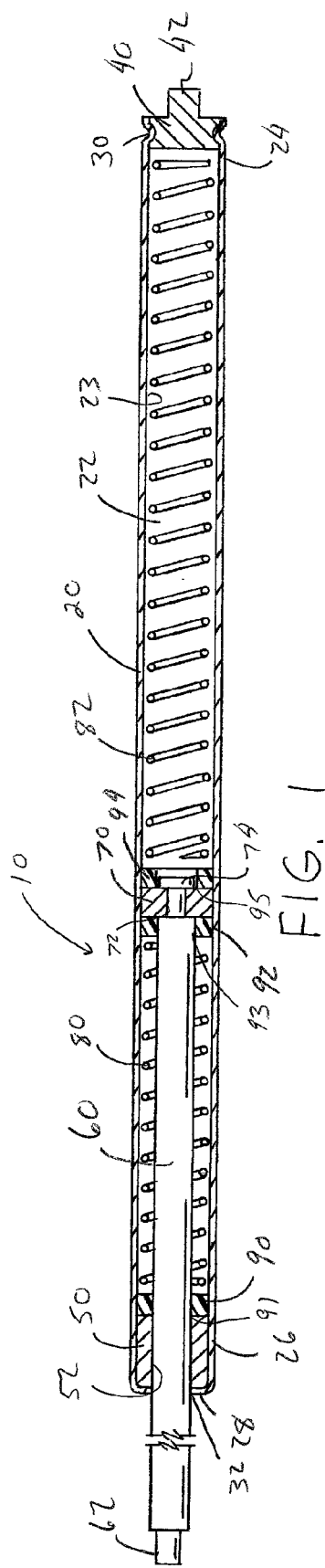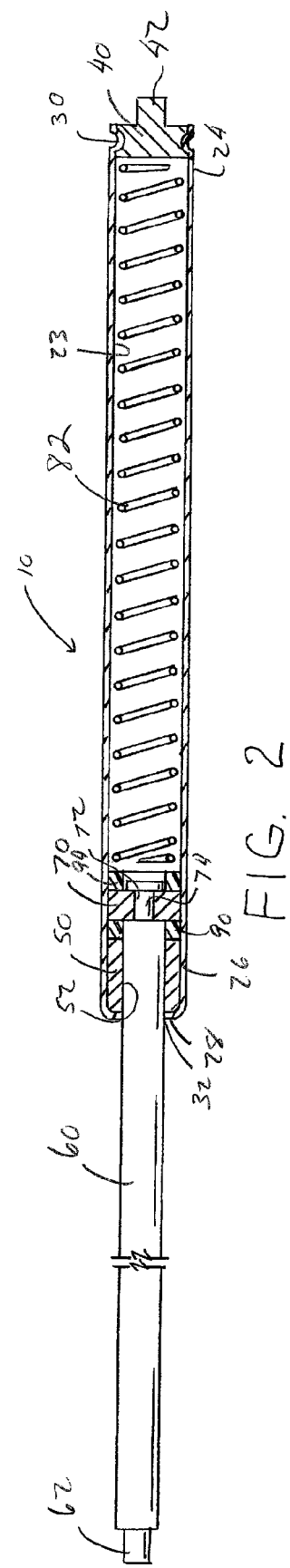

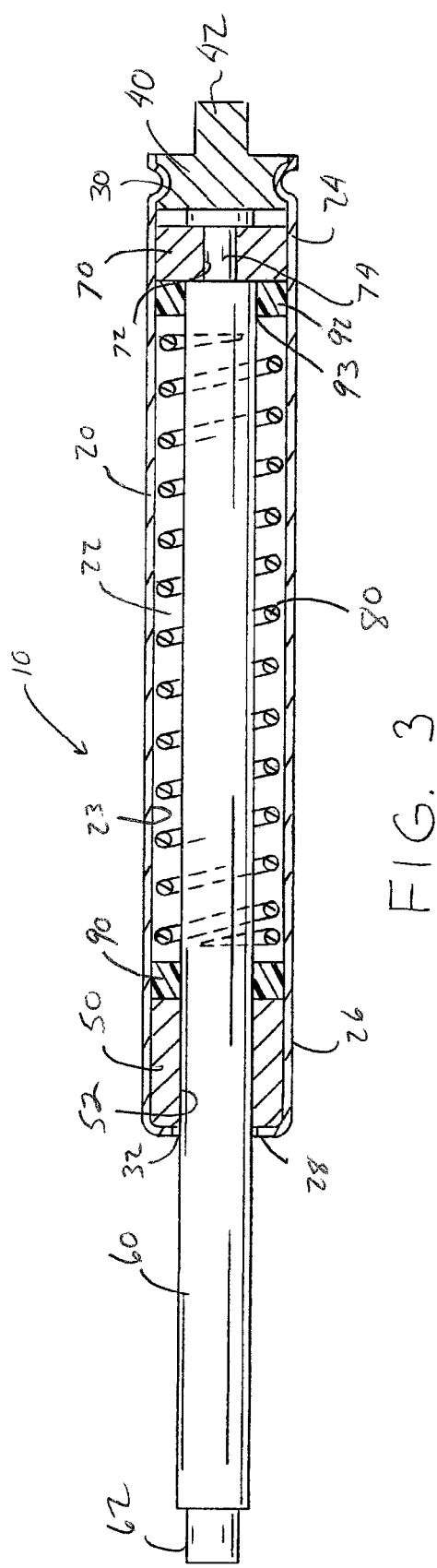

FRICTION DAMPENED MECHANICAL STRUT

The present invention claims priority on U.S. Patent Application Ser. No. 61/883,245 filed Sep. 27, 2013, which is incorporated herein by reference.

The present invention relates to spring systems, particularly to a spring system that includes a compressible material, and more particularly to a spring system that includes a compressible material that is used in conjunction with one or more mechanical springs. The spring system of the present invention can be used to control speed of the rod movement and/or end travel cushioning. The spring system of the present invention can be used in the medical field, automotive industry, manufacturing industry, building industry, etc. The spring system can include one or more rod members that are designed to exert a driving force on the elements to be displaced.

SUMMARY OF THE INVENTION

The present invention is directed to a novel spring assembly that includes the use of a compressible material to control speed and/or end travel cushioning of the rod when the rod is moved axially in the cylinder of the spring system. The mechanical struts generally include one or more mechanical springs; however, it can be appreciated that the strut can be a gas or hydraulic spring that may or may not include one or more mechanical springs. The strut includes a housing body having an internal cavity. The internal cavity can have a uniform cross-sectional shape and constant cross-sectional area along the longitudinal length of the housing body; however, this is not required. One or both ends of the housing can include a bushing. One end of the housing can include a plug or a permanent end seal. A rod having a front and rear end is axially movable in the internal cavity of the housing. The front end of the rod extends outwardly from one end of the housing. As can be appreciated, the front end of the rod can extend outwardly from one end of the housing and the back end of the rod can extend outwardly from the opposite end of the housing. The end of the rod that extends outwardly from the end of the housing can optionally include a connection arrangement (e.g., threaded end, connection hole, ribs, notches, etc.) that can be used to secure or connect the end of the rod to a fixture or structure. If one end of the housing does not have an end of the rod extending outwardly therefrom, such end of the housing can optionally include a connection arrangement (e.g., threaded end, connection hole, ribs, notches, etc.) that can be used to secure or connect such end of the housing to a fixture or structure. The size, length shape and material of the housing are non-limiting. Likewise, the size, shape, length, and material of the rod are non-limiting. A bushing is generally located at an end of the housing where the rod extends outwardly from the end of the housing. A piston or guide bushing is located in the internal cavity of the housing and connected to the rod. Generally, the piston is connected to one end of the rod; however, the piston can be connected to other regions of the rod that are located in the internal cavity of the housing. One or more mechanical springs can be located on one or both sides of the piston. When two or more mechanical springs are located in the internal cavity of the housing, the spring free length, wire type, wire thickness, cross-sectional shape of the wire, number of windings, wire material, and/or spring force of each of the springs can be the same or different. As can be appreciated, when two or more springs are located on the same side of the piston, two or more of the springs can be in a nested relationship and have the same or different winding direction when in the nested relationship; however, this is not required. As can be appreciated, a fluid (e.g., gas and/or liquid) can be located on one or both sides of the piston; however, this is not required. The fluid can be used in combination with one or more springs or be substituted for one or more springs. When a fluid is included in the internal cavity of the housing, the piston can be designed to controllably allow the fluid to flow through or past the piston as the piston moves along the longitudinal length of the housing; however, this is not required.

One or more compressible sleeves are positioned in the internal cavity of the housing. The one or more compressible sleeves are designed to compress and deform when a force is applied to the one or more compressible sleeves. When the one or more compressible sleeves are compressed and deformed, such deformation of the one or more compressible sleeves is designed to interact with the rod and/or interior surface of the internal cavity of the housing and thereby affect the movement and speed of movement of the rod as the rod moves along the longitudinal axis of the housing. As such, the force required to cause the rod to move along the longitudinal axis of the housing can be at least partially controlled by the use of one or more compressible sleeves in the internal cavity of the housing. When a plurality of compressible sleeves are used in the internal cavity of the housing, the thickness, shape, and/or material of the compressible sleeves can be the same or different. When one or more bushings are used, the material of the bushing is generally different from the material of the one or more compressible sleeves; however, this is not required. The material of the piston is generally different from the material of the one or more compressible sleeves; however, this is not required. The material of the rod, springs and housing is different from the material of the one or more compressible sleeves. The material used to form the one or more compressible sleeves is non-limiting. Non-limiting examples of materials include rubber, nylon, silicon, polyester, urethane, polyether-based urethane, various polymer materials, sponge material, cork material, etc. In one specific non-limiting material, the one or more compressible sleeves are formed of a compressible urethane material.

In one non-limiting aspect of the present invention, the material of the bushing, when used, is different from the material of the one or more compressible sleeves. The thickness of the bushing, when used, is greater than the thickness of the compressible sleeve that is in closest to the bushing; however, this is not required. Generally, the bushing, when used, is less compressible than at least one, and typically all, of the compressible sleeves used in the spring system. In one non-limiting configuration, at least one of the compressible sleeves is at least 10% more compressible than the bushing, when used, typically at least 15% more compressible than the bushing, when used, more typically at least 20% more compressible than the bushing, when used, still more typically at least 25% more compressible than the bushing, when used, and yet still more typically at least 30% more compressible than the bushing, when used. In another and/or alternative non-limiting configuration, the durometer of the compressible material is at least 20 Shore A and less than 75 Shore D using the ASTM D2240 testing standard. In one non-limiting configuration, the durometer of the compressible material is at least 30 Shore A and less than 100 Shore A using the ASTM D2240 testing standard, and typically at least 35 shore A and less than 80 Shore A using the ASTM D2240 testing standard.

In another and/or alternative non-limiting aspect of the present invention, there is provided a compressible sleeve in the interior cavity of the house and located at or near an end of the housing wherein the rod extends outwardly from the housing. The compressible material partially or fully encircles the rod. The compressible material is designed to frictionally engage the rod and slow the movement speed of the rod as the rod moves past the compressible material. The compressible material is designed to exert a frictional force between the compressible material and the rod that is proportional to the spacing between the compressible material and the rod. The friction due to the movement of the rod through the compressible material causes the compression of the compressible material, which compression results in the reduction of the spacing between the compressible material and the rod. The reduction of the spacing results in increased friction between the rod and the compressible material, which results in a reduced velocity of the rod through the compressible material. The amount of spacing between the compressible material and the rod and the durometer of the compressible material, and the thickness of the compressible material can be selected to obtain the desired deceleration speed of the rod past the compressible material as the rod moves along the longitudinal axis of the housing. In one non-limiting configuration, the compressible material fully encircles the rod and the opening in the compressible material that is to allow the rod to pass there through has a cross-section shape that is the same or similar to the cross-sectional shape of the rod that passes through the opening in the compressible material and the cross-sectional area of the opening is the same or greater than the cross-sectional area of the rod that passes through the compressible material. When the compressible material is positioned adjacent to a bushing, the compressible material can be secured to the bushing and/or the housing such that the compressible material maintains its position relative to the bushing as the rod moves along the longitudinal axis of the housing, or the compressible material can be not connected to the bushing or the housing to enable the compressible material to move longitudinally within the housing as the rod moves along the longitudinal axis of the housing.

In still another and/or alternative non-limiting aspect of the present invention, there is provided a compressible sleeve in the interior cavity of the housing and is in contact with one or more springs as the rod move along the longitudinal axis of the housing. The compressible sleeve can be positioned in one or more of the following locations: a) one or more compressible sleeves are positioned partially or fully about the rod and positioned between the bushing and one or more springs, b) one or more compressible sleeves are positioned partially or fully about the rod and positioned between the piston and one or more springs, c) one or more compressible sleeves are positioned between the piston and one or more springs, d) one or more compressible sleeves are positioned partially or fully about the rod and positioned between two or more springs, and/or e) one or more compressible sleeves are positioned between two or more springs. When the compressible material is partially or fully positioned about the rod, the compressible material is designed to frictionally engage the rod and slow the movement speed of the rod as the rod moves past the compressible material. The compressible material is designed to exert a frictional force between the compressible material and the rod that is proportional to the spacing between the compressible material and the rod. The friction due to the movement of the rod through the compressible material causes the compression of the compressible material, which compression results in the reduction of the spacing between the compression and material and the rod. The reduction of the spacing results in increased friction between the rod and the compressible material, which results in a reduced velocity of the rod through the compressible material. The amount of spacing between the compressible material and the rod and the durometer of the compressible material, and the thickness of the compressible material can be selected to obtain the desired deceleration speed of the rod past the compressible material as the rod moves along the longitudinal axis of the housing. In one non-limiting configuration, the compressible material fully encircles the rod and the opening in the compressible material that is to allow the rod to pass therethrough has a cross-section shape that is the same or similar to the cross-sectional shape of the rod that passes through the opening in the compressible material and the cross-sectional area of the opening is the same or greater than the cross-sectional area of the rod that passes through the compressible material. When the compressible material is positioned adjacent to a bushing, the compressible material can be secured to the bushing and/or the housing such that the compressible material maintains its position relative to the bushing as the rod moves along the longitudinal axis of the housing, or the compressible material can be not connected to the bushing or the housing to enable the compressible material to move longitudinally within the housing as the rod moves along the longitudinal axis of the housing. When the compressible material is positioned adjacent to a the piston, the compressible material can be secured to the piston such that the compressible material maintains its position relative to the piston as the rod moves along the longitudinal axis of the housing, or the compressible material can be not connected to the piston to enable the compressible material to move longitudinally within the housing relative to the piston as the rod moves along the longitudinal axis of the housing. When the compressible material is not positioned about the rod, the compressible material may or may not have any opening through the compressible material. The compressible material can be position on one or both sides of the piston; however, this is not required.

It is accordingly one non-limiting object of the present invention to provide an improved spring assembly.

Another and/or alternative non-limiting object of the present invention is the provision of a spring assembly that includes a compressible material.

Still another and/or alternative non-limiting object of the present invention is the provision of a spring assembly that includes a compressible material that is used to control speed of the rod movement and/or end travel cushioning.

Yet another and/or alternative non-limiting object of the present invention is the provision of a spring assembly that includes a compressible material that is positioned in the internal cavity of the housing and designed to compress and deform when a force is applied to the one or more compressible sleeves.

Still yet another and/or alternative non-limiting object of the present invention is the provision of a spring assembly that includes a compressible material that is designed to be compressed and deformed such that the deformation of compressible material is designed to interact with the rod and/or interior surface of the internal cavity of the housing and thereby affect the movement and/or speed of movement of the rod as the rod moves along the longitudinal axis of the housing.

Another and/or alternative non-limiting object of the present invention is the provision of a spring assembly that includes a compressible material wherein the thickness, shape, and/or material of the compressible material can be the same or different.

Still another and/or alternative non-limiting object of the present invention is the provision of a spring assembly that includes a compressible material that is formed of rubber, nylon, silicon, polyester, urethane, polyether-based urethane, various polymer materials, sponge material, cork material, etc.

Yet another and/or alternative non-limiting object of the present invention is the provision of a spring assembly that includes a compressible material wherein the thickness of the bushing is greater than the thickness of the compressible material.

Still yet another and/or alternative non-limiting object of the present invention is the provision of a spring assembly that includes a compressible material wherein the bushing is less compressible than the compressible material.

Another and/or alternative non-limiting object of the present invention is the provision of a spring assembly that includes a compressible material having a durometer of at least 20 Shore A and less than 75 Shore D using the ASTM D2240 testing standard.

Still another and/or alternative non-limiting object of the present invention is the provision of a spring assembly that includes a compressible material.

In another and/or alternative non-limiting aspect of the present invention, there is provided a compressible sleeve in the interior cavity of the housing and located at or near an end of the housing wherein the compressible material partially or fully encircles the rod.

Yet another and/or alternative non-limiting object of the present invention is the provision of a spring assembly that includes a compressible material that has a cross-section shape that is the same or similar to the cross-sectional shape of the rod that passes through the opening in the compressible material and the cross-sectional area of the opening is the same or greater than the cross-sectional area of the rod that passes through the compressible material.

Still yet another and/or alternative non-limiting object of the present invention is the provision of a spring assembly that includes a compressible material that is secured to the bushing and/or the housing such that the compressible material maintains its position relative to the bushing as the rod moves along the longitudinal axis of the housing, or the compressible material can be not connected to the bushing or the housing to enable the compressible material to move longitudinally within the housing as the rod moves along the longitudinal axis of the housing.

Another and/or alternative non-limiting object of the present invention is the provision of a spring assembly that includes a compressible material in the interior cavity of the house and is in contact with one or more springs as the as the rod moves along the longitudinal axis of the housing.

Still another and/or alternative non-limiting object of the present invention is the provision of a spring assembly that includes a compressible material that is positioned in one or more of the following locations: a) one or more compressible sleeves are positioned partially or fully about the rod and positioned between the bushing and one or more springs, b) one or more compressible sleeves are positioned partially or fully about the rod and positioned between the piston and one or more springs, c) one or more compressible sleeves are positioned between the piston and one or more springs, d) one or more compressible sleeves are positioned partially or fully about the rod and positioned between two or more springs, and/or e) one or more compressible sleeves are positioned between two or more springs.

Yet another and/or alternative non-limiting object of the present invention is the provision of a spring assembly that can be used in a wide variety of applications.

These and other objects and advantages will become apparent from the discussion of the distinction between the invention and the prior art and when considering the preferred embodiment as shown in the accompanying drawings.

BRIEF DESCRIPTION OF DRAWINGS

Reference may now be made to the drawings, which illustrate various embodiments that the invention may take in physical form and in certain parts and arrangements of parts wherein;

FIG. 1 is a cross-sectional view of a non-limiting spring assembly in accordance with the present invention;

FIG. 2 is a cross-sectional view of another non-limiting spring assembly in accordance with the present invention; and, FIG. 3 is a cross-sectional view of another non-limiting spring assembly in accordance with the present invention.

DESCRIPTION OF NON-LIMITING EMBODIMENTS OF THE INVENTION

Referring now to the drawings wherein the showing is for the purpose of illustrating non-limiting embodiments of the invention only and not for the purpose of limiting the same, FIGS. 1-3 illustrate non-limiting embodiments of a spring system that includes a compressible material. The spring systems are illustrated as being in the form of struts 10. The strut includes a housing body 20 having an internal cavity 22. As illustrated in FIGS. 1-3, the internal cavity has a generally uniform cross-sectional shape and a generally constant cross-sectional area along the longitudinal length of the housing body; however, this is not required. The materials used to form the housing body are non-limiting. The size, shape and length of the housing body are non-limiting. The rear portion 24 of housing body 20 includes a plug 40. The plug can be designed to be removable or irremovable from the housing body. Indents 30 in the housing body can optionally be used to facilitate in securing the plug to the housing. As can be appreciated, other or alternative arrangements can be used to secure the plug to the housing (e.g., adhesive, rivet, screw, pin, solder, weld bead, melted bond, etc.). As can also be appreciated, the rear end of the housing body can be a formed or sealed end that does not require a plug. The plug can be formed of a number of different materials (e.g., plastic or polymer material, rubber, metal, composite material, ceramic, wood, etc.). The rear end of the strut can optionally include a connection arrangement that can be used to facilitate in connecting the rear end of the strut to a fixture or other structure. As illustrated in FIGS. 1-3, the rear end of the plug optionally includes a connection arrangement 42 that can be used to facilitate in connecting the rear end of the strut to a fixture or other structure. The configuration of connection arrangement 42 is non-limiting (e.g., threaded end, connection hole, grooves, ribs, slots, notches, hook, etc.). The plug can be designed to form a fluid seal at the rear portion of the housing; however, this is not required.

One or both ends of the housing body include a bushing 50. As illustrated in FIGS. 1-3, bushing 50 is located at the front portion 26 of the housing body. The bushing includes an opening 52 through the longitudinal length of the bushing to enable a rod 60 to move through the bushing along the longitudinal axis of the housing body. As illustrated in FIGS. 1-3, the rod 60 is designed to only extend outwardly from the front end of the housing body. As such, the strut only includes a bushing at the front portion of the housing body. When the rod is designed to extend outwardly from both the front and rear ends of the housing body, a bushing is generally positioned at both the front and rear portions of the housing body. The bush can be designed to be removable or irremovable form the housing body. Front flanges 28 in the housing body can optionally be used to facilitate in securing the bushing to the housing. As can be appreciated, other or alternative arrangements can be used to secure the bushing to the housing (e.g., adhesive, rivet, screw, nail, pin, solder, weld bead, melted bond, ribs, grooves, indents, notches, etc.). The bushing can be formed of a number of different materials (e.g., plastic or polymer material, rubber, metal, composite material, ceramic, wood, etc.). The bushing can be designed to form a fluid seal at the front portion of the housing; however, this is not required. The bushing is designed to partially or fully encircle a portion of the rod.

As illustrated in FIGS. 1-3, rod 60 extends outwardly from the front end of the housing body through opening 32 and is designed to move along a longitudinal axis of the housing body. The rod is illustrated as being positioned along the central longitudinal axis of the housing body; however, this is not required. The length, shape, configuration and material of the rod are non-limiting. As illustrated in FIGS. 1-3, the housing body has a generally tubular shape and the cross-sectional shape of the rod and housing body is generally circular; however, this is not required. The cross-sectional area of the rod is generally constant along the length of the portion of the rod that moves through bushing 50; however, this is not required. The cross-sectional area of the portion of the rod that moves within the cavity 22 of the housing body is generally less than the cross-sectional area of the cavity of the housing body. As illustrated in FIGS. 1-3, the front end 62 of the rod optionally includes a connection arrangement that can be used to facilitate in connecting the front end of the rod to a fixture or other structure. The configuration of connection arrangement is non-limiting (e.g., threaded end, connection hole, grooves, ribs, notches, slots, hook, etc.). As can be appreciated, if the rod is designed to extend outwardly from both ends of the housing body, one or both ends of the rod can optionally include a connection arrangement.

The rod also typically includes a piston or guide bushing 70 that is formed on or connected to the rod. Generally, the piston is connected to the rear end or rear portion of the rod; however, the piston can be connected to other regions of the rod that are located in the internal cavity of the housing body. The piston can be connected to the rod by any number of arrangements (e.g., adhesive, rivet, screw, nail, pin, solder, weld bead, melted bond, ribs, grooves, indents, notches, etc.). As illustrated in FIGS. 1-3, the piston includes a hole 72 wherein the body of a screw 74 is inserted therethrough and threaded to the end of the rod, thereby securing the piston to the end of the rod.

One or more mechanical springs are optionally located in the internal cavity of the housing body. As illustrated in FIG. 1, a mechanical spring 80, 82 is located on each side of the piston. As illustrated in FIGS. 2-3, a single mechanical spring 80 is located on one side of the piston. As can be appreciated with regard to the strut illustrated in FIG. 1, two or more mechanical springs can be located on one or both sides of the piston. As can be appreciated with regard to the struts illustrated in FIG. 2-3, two or more mechanical springs can be located on one side of the piston. When two or more mechanical springs are located in the internal cavity of the housing, the spring free length, wire type, wire thickness, cross-sectional shape of the wire, number of windings, wire material, and/or spring force of each of the springs can be the same or different. The free length of one or more of the mechanical springs can be greater than, equal to, or less than the longitudinal length of the internal cavity. As can be appreciated, when two or more mechanical springs are located on the same side of the piston, two or more of the mechanical springs can be in a nested relationship and have the same or different winding direction when in the nested relationship; however, this is not required. As can be appreciated, a fluid (e.g., gas and/or liquid) can be located on one or both sides of the piston; however, this is not required. The fluid can be used in combination with one or more mechanical springs or be substituted for one or more mechanical springs. When a fluid is included in the internal cavity of the housing body, the piston can be designed to controllably allow the fluid to flow through or past the piston as the piston moves along the longitudinal length of the housing; however, this is not required.

As illustrated in FIGS. 1-3, the struts include one or more compressible sleeves 90, 92, and 94 that are positioned in the internal cavity of the housing body. The number of compressible sleeves included in the internal cavity of the housing body is non-limiting. The size, shape and thickness of the compressible sleeves are non-limiting. The one or more compressible sleeves are designed to compress and deform when a force is applied to the one or more compressible sleeves. When the one or more compressible sleeves are compressed and deformed, such deformation of the one or more compressible sleeves is designed to interact with the rod 60 and/or interior surface 23 of the internal cavity of the housing body, and thereby affect the movement and speed of movement of the rod as the rod moves along the longitudinal axis of the housing body. As such the force required to cause the rod to move along the longitudinal axis of the housing body can be at least partially controlled by the use of the one or more compressible sleeves. When a plurality of compressible sleeves is used, the thickness, shape, and/or material of the compressible sleeves can be the same or different. The material used to form the one or more compressible sleeves is non-limiting. Non-limiting examples of materials include rubber, various polymer materials, nylon, silicon, polyester, urethane, polyether-based urethane, various polymer materials, sponge material, cork material, etc. In one specific non-limiting material, the one or more compressible sleeves are formed of a compressible urethane material. The durometer of the compressible material is at least 20 Shore A and less than 75 Shore D using the ASTM D2240 testing standard. In one non-limiting configuration, the durometer of the compressible material is at least 30 Shore A and less than 100 Shore A using the ASTM D2240 testing standard, and typically at least 35 shore A and less than 80 Shore A using the ASTM D2240 testing standard. The amount of friction force applied by the one or more compressible sleeves to the rod and/or interior surface of the internal cavity of the housing body can be controlled by controlling the 1) size, thickness, shape and/or material of the one or more compressible sleeves, 2) the spacing of the one or more compressible sleeves from the interior surface of the internal cavity of the housing body, 3) the spacing of the one or more compressible sleeves from the rod, 4) the degree to which the compressible sleeve compresses and deforms in a compressed state, 5) the durometer of the one or more compressible sleeves, and/or 6) the amount of force applied to the compressible sleeve during the axial movement of the rod in the housing body.

Referring now to FIG. 1, the compressible sleeve 90 is positioned adjacent to bushing 50. The compressible sleeve may or may not be connected to bushing 50. The compressible sleeve includes an opening 91 that is designed to enable a portion of the rod to pass longitudinally through the compressible sleeve. The thickness of compressible sleeve 90 is illustrated as being less than the thickness of the bushing; however, this is not required. Typically, the material of compressible sleeve 90 is different from the material of the bushing. Generally, the compressibility of the bushing is less than the compressibility of compressible sleeve 90 and/or the durometer of the bushing is generally greater than the durometer of compressible sleeve 90; however, this is not required.

As illustrated in FIG. 1, compressible sleeve 92 is positioned adjacent to the front end of piston 70. Compressible sleeve 92 may or may not be connected to piston 70. Compressible sleeve includes an opening 93 that is designed to enable a portion of the rod to pass longitudinally through the compressible sleeve. The thickness of compressible sleeve 92 is illustrated as being less than the thickness of the piston; however, this is not required. Typically, the material of compressible sleeve 92 is different from the material of the piston. Generally, the compressibility of the piston is less than the compressibility of compressible sleeve 92 and/or the durometer of the piston is generally greater than the durometer of compressible sleeve 92; however, this is not required. The thickness and/or material of compressible sleeve 92 can be the same or different from the thickness and/or material of compressible sleeve 90.

As illustrated in FIG. 1, mechanical spring 80 is positioned between compressible sleeves 90 and 92. As can be appreciated, strut 10 illustrated in FIG. 1 can optionally be absent compressible sleeve 90 or 92. As can also be appreciated, strut 10 illustrated in FIG. 1 can optionally include two or more compressible sleeves at one or both sides of mechanical spring 80.

FIG. 1 also illustrates that compressible sleeve 94 is positioned adjacent to the back end of piston 70. Compressible sleeve 94 may or may not be connected to piston 70. Compressible sleeve 94 optionally includes an opening 95. The thickness of compressible sleeve 94 is illustrated as being less than the thickness of the piston; however, this is not required. The thickness and/or material of compressible sleeve 94 can be the same or different from the thickness and/or material of compressible sleeves 90 or 92. Typically, the material of compressible sleeve 94 is different from the material of the piston. Generally, the compressibility of the piston is less than the compressibility of compressible sleeve 94 and/or the durometer of the piston is generally greater than the durometer of compressible sleeve 94; however, this is not required.

In operation, when rod 60 in the strut of FIG. 1 is axially moved into the internal cavity of the housing body, compressible sleeve 94 on the back end of piston 70 is caused to be compressed by mechanical spring 82. Depending on the length of mechanical spring 82, the compression of compressible sleeve 94 can begin immediately or at the point that the rod has retracted a sufficient distance into the internal cavity to cause mechanical spring 82 to compress against compressible sleeve 94. As the rod continues its axial movement into the internal cavity of the housing body, mechanical spring 82 is caused to compress and thereby exert a force on compressible sleeve 94. The compression of compressible sleeve 94 causes the compressible sleeve to deform and thereby engage interior surface 23 of internal cavity 22, and thereby creating and/or increasing a friction force between the compressible sleeve and the housing body. Further compression of mechanical spring 82 generally results in further compression of compressible sleeve 94, which further compression can result in increased friction between the compressible sleeve and the interior surface 23 of internal cavity 22. This increased friction can be a linear or non-linear increase as mechanical spring 82 is compressed. This resulting friction or increased friction between compressible sleeve 94 and the interior surface 23 of internal cavity 22 can be used to create a dampening effect that decreases the velocity of the rod as the rod retracts into the housing body.

Also, as rod 60 retracts into the housing body, the compression force applied by mechanical spring 80 on compressible sleeves 90 and 92 decreases. As less compression force is applied by mechanical spring 80 on compressible sleeves 90 and 92, the compressible sleeves reduce and deform until the compressible sleeves revert fully or nearly fully to their original or pre-compression shapes. Such reversion to the original or pre-compression shapes of the compressible sleeves 90 and 92 results in a reduction of friction force between a) compressible sleeves 90 and/or 92 and the interior surface 23 of internal cavity 22, and/or b) compressible sleeves 90 and/or 92 and rod 60. This decreased friction can be a linear or a non-linear decrease as mechanical spring 80 is decompressed.

When rod 60 moves in reversed direction and begins to extend further outwardly from the housing body, the compression force on compressible sleeve 94 by mechanical spring 82 begins to reduce until compressible sleeve 94 reverts fully or nearly fully to its original or pre-compression shape, and the compression force applied by mechanical spring 80 on compressible sleeves 90 and 92 increases thereby causing the compressible sleeves to compress and deform. The decreased friction caused by compressible sleeve 94 reverting fully or nearly fully to its original or pre-compression shape can be a linear or a non-linear decrease as mechanical spring 82 is decompressed. Likewise, increased friction caused by compressible sleeves 90 and/or 92 as the compressible sleeves deform can be a linear or a non-linear increase as mechanical spring 80 is compressed. This resulting friction or increased friction between compressible sleeves 90 and/or 92 and the interior surface 23 of internal cavity 22 and/or rod 60 can be used to create a dampening effect that decreases the velocity of the rod as the rod extends from the housing body.

The strut in FIG. 1 can optionally include a compressible fluid (e.g., gas and/or liquid). The compressible fluid can be used in conjunction with the mechanical springs and/or be used as a substitute for one or more of the mechanical springs. The optional compressible fluid can be positioned between piston 60 and bushing 70 and/or between piston 60 and plug 40. The compression of the fluid can optionally be used to a) cause a compression force to be applied to compressible sleeves 90 and/or 92, and/or b) cause a compression force to be applied to compressible sleeve 94. When the fluid in the strut is to be used to create a compression force and/or damping action, the strut generally includes one or more fluid seals to prevent the fluid from escaping the internal cavity. The piston may optionally be designed to allow the fluid to controllably move through and/or about the piston as the rod moves longitudinally in the housing body.

Referring now to FIG. 2, strut 10 is similar to strut 10 illustrated in FIG. 1 except that the strut does not include mechanical spring 80 and compressible sleeve 92. As such, the numbering of the common strut components will be maintained. The properties and function of the common components are also the same unless stated otherwise below when describing the strut of FIG. 2. The compression and decompression of compressible sleeve 94 by mechanical spring 82 is the same as discussed above with respect to the strut in FIG. 1, thus will not be further described.

Compressible sleeve 90 can be connected to either piston 60 or bushing 50. Alternatively, compressible sleeve 90 may not be connected to either piston 60 or bushing 50. The compression and deformation of compressible sleeve 90 is cause by the compression forces between piston 60 and busing 50. Such compression forces occur when the rod is near fully extended from the housing body, unless a compressible fluid is positioned between piston 60 and bushing 50. The compressible sleeve can function as a cushion between the piston and the bushing to reduce or prevent damage to the bushing and/or piston when the rod moves to the fully extended position; however, this is not required. When compressible sleeve 90 is compressed, the compressible sleeve deforms and results in friction or increased friction between compressible sleeve 90 and rod 60. Such friction or increased friction can be used to create a dampening effect that decreases the velocity of the rod as the rod extends from the housing body. The increased friction caused by compressible sleeves 90 as the compressible sleeve deforms can be a linear or a non-linear increase. When rod 60 retracts into the housing body, the piston also retracts from bushing 50, thereby resulting in the reduction or elimination of the compression force between the piston and bushing. The reduction or elimination of the compression force between the piston and bushing results in compressible sleeve 90 reverting fully or nearly fully to its original or pre-compression shape, thereby causing a reduction of the friction force between compressible sleeve 90 and rod 60. The reduced friction caused by compressible sleeve 90 reverting fully or nearly fully to its original or pre-compression shape can be a linear or a non-linear decrease.

When an optional compressible fluid (e.g., gas and/or liquid) is positioned between piston 60 and bushing 70, the compression of the fluid can optionally be used to cause a compression force to be applied to compressible sleeve 90. Such an optional arrangement can be used to cause the compressible sleeve to begin to deform and compress prior to the point that the piston and bushing apply a compression force to the compressible sleeve as described above. Likewise, the optional use of the fluid can be used to maintain the compressible sleeve in a deformed stated after the piston has retracted from the bushing. As can be appreciated, a compressible fluid can also or alternatively be located between piston 60 and plug 40 to create a damping action as the rod retracts into the housing body. When the fluid in the strut is to be used to create a compression force and/or damping action, the strut generally includes one or more fluid seals to prevent the fluid from escaping the internal cavity. The piston may optionally be designed to allow the fluid to controllably move through and/or about the piston as the rod move longitudinally in the housing body. As can be appreciated, one or more of the optional features described in the strut of FIG. 1 can also be used in the strut of FIG. 2.

Referring now to FIG. 3, strut 10 is similar to strut 10 illustrated in FIG. 1 except that the strut does not include a mechanical spring 82 and compressible sleeve 94. As such, the numbering of the common strut components will be maintained. The properties and function of the common components are also the same unless stated otherwise below when describing the strut of FIG. 3. The compression and decompression of compressible sleeves 90 and 92 by mechanical spring 80 is the same as discussed above with respect to the strut in FIG. 1, thus will not be further described. As can be appreciated, one or more of the optional features described in the strut of FIGS. 1 and 2 can also be used in the strut of FIG. 3.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A spring system that includes a material used to affect an operation of the spring system between fully extended and fully retracted positions, said spring system comprising:
    a housing body having a front portion with a front end, a rear portion with a rear end, and an internal cavity;
    a rod that is at least partially positioned in said internal cavity and at least partially extending outwardly from said front end of said housing body, said rod movable between fully extended and fully retracted positions;
    a front bushing positioned at least partially in said internal cavity and located at said front portion of said housing, said front bushing including an opening to enable at least a portion of said rod to move through said opening as said rod moves between fully extended and fully retracted positions;
    a piston connected to said rod;
    a front compressible and deformable material used to affect movement of said rod within said internal cavity when said first front compressible and deformable material is exposed to a compression force, said front compressible and deformable material is positioned in said internal cavity of said housing between said piston and said first bushing and engages said front bushing when said rod moves to said fully extended position, said front compressible and deformable material including a longitudinal opening that enables said rod to move therethrough; and,
    a front mechanical spring positioned in said internal cavity of said housing between said piston and said first bushing, at least a portion of said rod extending through said front mechanical spring, a first end of said front mechanical spring engaging said front compressible and deformable material when said rod moves to said fully extended position.

2. The spring system as defined in claim 1, wherein said front compressible and deformable material is affixed to said first bushing.

3. The spring system as defined in claim 2, including a second mechanical spring positioned between said piston and said rear end of said housing.

4. The spring system as defined in claim 2, including a second piston compressible and deformable material, said second piston compressible and deformable material is positioned in said internal cavity of said housing between said piston and said rear end of said housing.

5. The spring system as defined in claim 4, including a second mechanical spring positioned between said piston and said rear end of said housing, a first end of said second mechanical spring contacting said second piston compressible and deformable material when said rod moves to said fully retracted position.

6. The spring system as defined in claim 1, including a first piston compressible and deformable material, said first piston compressible and deformable material positioned in said internal cavity of said housing between said piston and said first bushing, a second end of said front mechanical spring engaging said first piston compressible and deformable material when said rod moves to said fully extended position, said front mechanical spring positioned between said front and said first piston compressible and deformable materials.

7. The spring system as defined in claim 6, including a second piston compressible and deformable material, said second piston compressible and deformable material is positioned in said internal cavity of said housing between said piston and said rear end of said housing.

8. The spring system as defined in claim 7, including a second mechanical spring positioned between said piston and said rear end of said housing, a first end of said second mechanical spring contacting said second piston compressible and deformable material when said rod moves to said fully retracted position.

9. The spring system as defined in claim 6, wherein said first piston compressible and deformable material is affixed to said piston.

10. The spring system as defined in claim 9, including a second piston compressible and deformable material, said second piston compressible and deformable material is positioned in said internal cavity of said housing between said piston and said rear end of said housing.

11. The spring system as defined in claim 10, including a second mechanical spring positioned between said piston and said rear end of said housing, a first end of said second mechanical spring contacting said second piston compressible and deformable material when said rod moves to said fully retracted position.

12. The spring system as defined in claim 9, including a second mechanical spring positioned between said piston and said rear end of said housing.

13. The spring system as defined in claim 6, including a second mechanical spring positioned between said piston and said rear end of said housing.

14. The spring system as defined in claim 1, including a second piston compressible and deformable material, said second piston compressible and deformable material is positioned in said internal cavity of said housing between said piston and said rear end of said housing.

15. The spring system as defined in claim 14, including a second mechanical spring positioned between said piston and said rear end of said housing, a first end of said second mechanical spring contacting said second piston compressible and deformable material when said rod moves to said fully retracted position.

16. The spring system as defined in claim 1, including a second piston compressible and deformable material, said second piston compressible and deformable material is positioned in said internal cavity of said housing between said piston and said rear end of said housing.

17. The spring system as defined in claim 16, including a second mechanical spring positioned between said piston and said rear end of said housing, a first end of said second mechanical spring contacting said second piston compressible and deformable material when said rod moves to said fully retracted position.

18. The spring system as defined in claim 1, including a second mechanical spring is positioned between said piston and said rear end of said housing.

19. The spring system as defined in claim 1, including a second mechanical spring positioned between said piston and said rear end of said housing.

20. A method for affecting an operation of the spring system between fully extended and fully retracted positions, said method comprising the steps of:
   a. providing a spring system, said spring system comprising:
   a housing body having a front portion with a front end, a rear portion with a rear end, and an internal cavity;
   a rod that is at least partially positioned in said internal cavity and at least partially extending outwardly from said front end of said housing body, said rod movable between fully extended and fully retracted positions;
   a front bushing positioned at least partially in said internal cavity and located at said front portion of said housing, said front bushing including an opening to enable at least a portion of said rod to move through said opening as said rod moves between fully extended and fully retracted positions;
   a piston connected to said rod;
   a front compressible and deformable material used to affect movement of said rod within said internal cavity when said first front compressible and deformable material is exposed to a compression force, said front compressible and deformable material is positioned in said internal cavity of said housing between said piston and said first bushing and engages said front bushing when said rod moves to said fully extended position, said front compressible and deformable material including a longitudinal opening that enables said rod to move therethrough; and,
   a front mechanical spring positioned in said internal cavity of said housing between said piston and said first bushing, at least a portion of said rod extending through said front mechanical spring, a first end of said front mechanical spring engaging said front compressible and deformable material when said rod moves to said fully extended position; and,
   b. applying a force to said rod to cause said rod to move within said housing body, said movement of said rod causing said front compressible and deformable material to deform and thereby cause an increased friction between a) said front compressible and deformable material and an interior surface of internal cavity, and b) said front compressible and deformable material and said rod.

21. The method as defined in claim 20, wherein said front compressible and deformable material is affixed to said first bushing.

22. The method as defined in claim 20, including a first piston compressible and deformable material, said first piston compressible and deformable material positioned in said internal cavity of said housing between said piston and said first bushing, a second end of said front mechanical spring engaging said first piston compressible and deformable material when said rod moves to said fully extended position, said front mechanical spring positioned between said front and said first piston compressible and deformable materials.

23. The method as defined in claim 22, wherein said first piston compressible and deformable material is affixed to said piston.

24. The method as defined in claim 23, including a second piston compressible and deformable material, said second piston compressible and deformable material is positioned in said internal cavity of said housing between said piston and said rear end of said housing.

25. The method as defined in claim 24, including a second mechanical spring is positioned between said piston and said rear end of said housing.

\* \* \* \* \*